United States Patent
Lopez et al.

(10) Patent No.: US 8,565,340 B2
(45) Date of Patent: Oct. 22, 2013

(54) METHOD AND DEVICE FOR TRANSMISSION OF SIGNALS IN A GSM SYSTEM

(75) Inventors: Miguel M. Lopez, Solna (SE); Tomas Forssén, Västerås (SE); Olof Liberg, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 279 days.

(21) Appl. No.: 13/039,377

(22) Filed: Mar. 3, 2011

(65) Prior Publication Data

US 2011/0228879 A1    Sep. 22, 2011

Related U.S. Application Data

(60) Provisional application No. 61/314,666, filed on Mar. 17, 2010.

(51) Int. Cl.
*H04K 1/02*    (2006.01)

(52) U.S. Cl.
USPC ............ 375/296; 370/329; 370/336; 370/389

(58) Field of Classification Search
USPC .......... 370/310, 329, 336, 345, 389; 375/265, 375/295, 296
See application file for complete search history.

(56) References Cited

U.S. PATENT DOCUMENTS

| | | | |
|---|---|---|---|
| 2007/0249404 A1* | 10/2007 | Gao et al. | 455/562.1 |
| 2007/0268980 A1* | 11/2007 | Brannstorm et al. | 375/265 |
| 2010/0135290 A1* | 6/2010 | Curcio | 370/389 |

FOREIGN PATENT DOCUMENTS

| | | |
|---|---|---|
| EP | 1798922 A1 | 6/2007 |
| WO | 2007092945 A2 | 8/2007 |

OTHER PUBLICATIONS

Priyanto et al., "A Spectrum Shaping Technique to Control Spectrum Emission of UTRA LTE User Equipment," NORCHIP, 2007, IEEE, Piscataway, NJ, pp. 1-4, Nov. 19, 2007.

Yan et al., "Improved Modulation Techniques for Wireless Communications: Raised Cosine Filtered FQPSK-FQPSK (RC)," IEEE Transactions on Broadcasting, IEEE Service Center, Piscataway, NJ, vol. 43, No. 2, pp. 221-226, Jun. 1, 1997.

* cited by examiner

*Primary Examiner* — Leon-Viet Nguyen
(74) *Attorney, Agent, or Firm* — Coats & Bennett, P.L.L.C.

(57) ABSTRACT

Methods and devices for transmitting a burst of signals in a cellular radio system supporting data transmission using EGPRS/EGPRS2 are provided. The transmission involves providing additional symbols in the EGPRS/EGPRS2 burst thereby forming a long burst and pulse shaping the long burst to form a long baseband signal whose duration exceeds the duration of one EGPRS/EGPRS2 time slot. The long baseband signal is then shortened to a shortened burst having the duration of an EGPRS/EGPRS2 time slot wherein the shortened burst fulfills the same spectrum mask requirement as the EGPRS/EGPRS2 burst, which can be transmitted.

10 Claims, 7 Drawing Sheets

METHOD AND DEVICE FOR TRANSMISSION OF SIGNALS IN A GSM SYSTEM

RELATED APPLICATIONS

This application claims priority to U.S. Provisional Patent Application No. 61/314,666, filed Mar. 17, 2010 and incorporated herein by reference in its entirety.

TECHNICAL FIELD

The present invention relates to a method and a device for transmitting signals in a GSM system.

BACKGROUND

Figure 1:
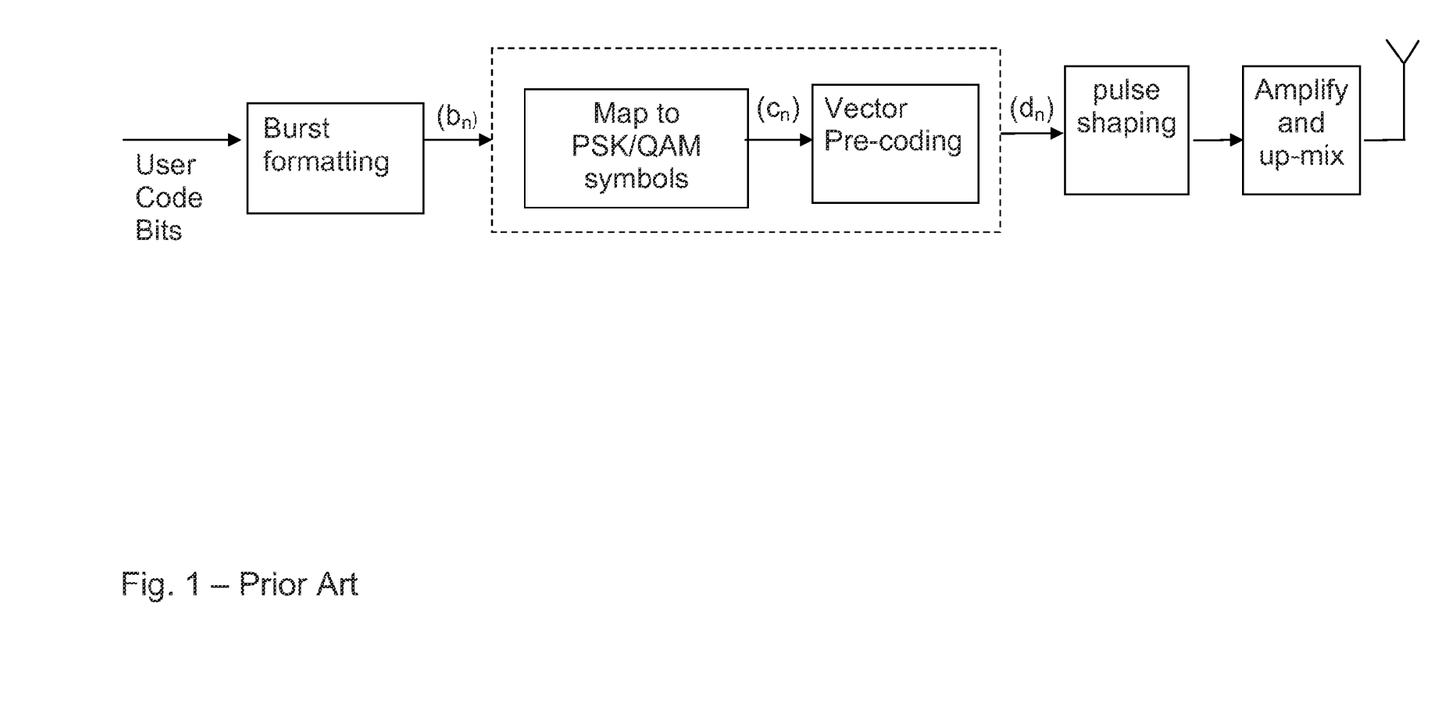
FIG. 1 is a high level view of a transmitter for precoded EGPRS/EGPRS2.

Despite the fact that Global System for Mobile Communication (GSM) networks have been commercially deployed for almost two decades, interest on the continued improvement of the GSM/Enhanced Data rates for GSM Evolution (EDGE) technology has not dwindled. Network equipment manufacturers, mobile equipment manufacturers and telecom operators continue to develop the GSM system further. Improvements to the hardware/spectral efficiencies for both voice and packet data services are being actively sought. To this end, precoded EGPRS/EGPRS phase 2 (EGPRS2) been proposed. Precoding involves transformation of the symbol sequence using some suitable transform. Typically a Fourier Transformation is used. FIG. 1 gives a high level view of precoded EGPRS/EGPRS2. The blocks within the dashed box in FIG. 1 will now be described. After burst formatting, the bit sequence ($b_n$) has the following structure.

$$\left( \underbrace{b_1, \ldots, b_\alpha}_{guard}, \underbrace{b_{\alpha+1}, \ldots, b_\beta}_{tail}, \underbrace{b_{\beta+1}, \ldots, b_\gamma}_{data}, \right. \quad (1)$$

$$\left. \underbrace{b_{\gamma+1}, \ldots, b_\delta}_{training}, \underbrace{b_{\delta+1}, \ldots, b_\varepsilon}_{data}, \underbrace{b_{\varepsilon+1}, \ldots, b_\varphi}_{tail}, \underbrace{b_{\varphi+1}, \ldots, b_\phi}_{guard} \right)$$

These bits are mapped to symbols drawn from a Phase Shift Keying (PSK)/Quadrature Amplitude Modulation (QAM) symbol constellation. The letters s,x,t,g will be used to denote PSK/QAM symbols that carry training, payload, tail or guard bits respectively. Thus, $(b_1, \ldots, b_\alpha, b_{\phi+1}, \ldots, b_\phi) \to \vec{g} = (g_1, \ldots, g_\eta)$ (guard)

$(b_{\alpha+1}, \ldots, b_\beta, b_{\varepsilon+1}, \ldots, b_\varphi) \to \vec{t} = (t_1, \ldots, t_\nu)$ (tail)

$(b_{\beta+1}, \ldots, b_\gamma, b_{\delta+1}, \ldots, b_\varepsilon) \to \vec{x} = (x_1, \ldots, x_D)$ (payload)

$(b_{\gamma+1}, \ldots, b_\delta) \to \vec{s} = (s_1, \ldots, s_{N_{tr}})$ (training symbols), where $\eta$ is the total number of guard symbols, $\nu$ is the total number of tail symbols, D is the total number of payload symbols and $N_{tr}$ is the number of training symbols. The total number of payload plus training symbols is $N=D+N_{tr}$ and the total number of symbols in the burst is $K=N+\eta+\nu$.

The output of the symbol mapping block is the sequence of symbols $$[c_1, \ldots, c_K] \stackrel{def}{=} [\vec{g}, \vec{t}, \vec{x}, \vec{d}]. \quad (2)$$

It is convenient to intercalate the training symbols and the payload symbols for synchronization and channel estimation purposes. A vector $\vec{z}$ of length N is constructed from the payload $\vec{x}$ and training symbols $\vec{s}$ accordingly.

$$\vec{z} = [z_1, \ldots, z_N]^T \stackrel{def}{=} [x_1, \ldots, s_1, \ldots, x_p, s_m, \ldots, s_{N_{tr}}, \ldots, x_D] \quad (3)$$

$$\updownarrow \quad \updownarrow \quad \updownarrow \quad \updownarrow \quad \updownarrow$$

$$k(1) \ldots n(1) \ldots k(p) \; n(m) \quad n(N_{tr}) \quad k(D)$$

The location of the training symbols is given by the indices $(n(m))_{m=1}^{N_{tr}}$. Likewise, the location of the payload symbols is given by $(k(m))_{m=1}^{D}$. That is, $z_{n(p)}=s_p$ and $z_{k(p)}=x_p$. The location of the training symbols should be chosen carefully as it has a large impact on the receiver performance. Discrete Fourier Transform (DFT)-precoding is applied to $\vec{z}$ to form a new sequence of complex numbers $\vec{Z}$ as follows. Let W be the Fourier transform matrix of size N×N whose entry in the m-th row and i-th column is $$W_{m,i} \stackrel{def}{=} \frac{1}{\sqrt{N}} \exp(-j2\pi(m-1)(i-1)/N),$$

for $1 \le m, i \le N$. The pre-coding operation is $\vec{Z} = W^H \cdot \vec{z}$.

Multiplication by the matrix $W^H$ can be implemented efficiently using the fast Fourier transform. Next, an integer $L \ge 0$ is chosen and the last L terms in $\vec{Z}$ are appended at the beginning of $\vec{Z}$ to form a new vector $\vec{Z}^P$. In other words, a cyclic prefix of length L is added. For example the values L=0 (no prefix) or L=5 (typical GSM channel length) may be used. Using vector notation, the precoded symbols with the cyclic prefix added are $$\vec{Z}^P = [Z_1^P, \ldots, Z_{N+L}^P] \stackrel{def}{=} [Z_{N-L}, Z_{N-L+1}, \ldots, Z_N, Z_1, Z_2, \ldots, Z_N].$$

The output of the vector precoding (IDFT) block is the sequence of complex numbers $$[d_1, d_2, \ldots, d_K] \stackrel{def}{=} \quad (4)$$

$$\left[ \underbrace{g_1, \ldots}_{guard}, \underbrace{t_1, \ldots}_{tail}, \underbrace{Z_1^P, Z_2^P, \ldots, Z_{N+L}^P}_{payload+pilots}, \underbrace{\ldots, t_\nu}_{tail}, \underbrace{\ldots, g_\eta}_{guard} \right].$$

This sequence is pulse shaped to obtain the baseband signal, as follows.

$$y(t) = \sum_n d_n \cdot p(t - nT + \varphi), \; 0 \le t \le \tau. \quad (5)$$

Here $p$ is the pulse shaping filter, T is the symbol period (in seconds), $\phi$ is the phase and $\tau$ is the duration of the burst (in seconds). Finally, the pulse shaped signal (5) is sent to the Radio frequency (RF) modulator.

In order to make precoded EGPRS backwards compatible with EGPRS/EGPRS2, the linearized GMSK pulse shaping filter is used, see 3GPP TS 45.004 Modulation. This is a partial response pulse, which introduces a significant amount of intersymbol interference (ISI) in the transmitted signal. Therefore, the length L of the cyclic prefix must be chosen large enough to cover not only the time dispersion in the radio channel and the receive filtering but also the large time dispersion introduced by the pulse shaping filter. This entails a larger overhead and therefore a loss of bandwidth. Furthermore, due to backward compatibility, the size N of the IDFT is not a highly composite number. Even though there are efficient Inverse Fast Fourier Transform (IFFT) algorithms for any size, the algorithms for highly composite lengths are much faster. Fast, highly efficient IFFT's are desirable for backward compatibility with legacy base station hardware, and reuse of existing mobile station (MS) platforms.

Moreover, highly efficient Fast Fourier Transforms (FFT's) also decrease the power consumption in the MS. For example, at the normal symbol rate N=142=116+26=2×71 (71 is a prime number) is not a highly composite number.

Hence there exists a need to reduce the above problems and to provide a more efficient method for transmitting signals in a GSM system. In particular when the signals are precoded.

SUMMARY

It is an object of the present invention to provide an improved method and device for transmitting data in a GSM system and to address the problems as outlined above.

This object and others are obtained by the method and device as described herein.

Thus, as realized by the inventors, one of the first tasks performed in a typical receiver for precoded EGPRS is Cyclic Prefix (CP) removal. However, since a significant amount of intersymbol interference (ISI) is introduced already at the transmitter, it is possible to modify a part of the CP in the transmitter, after having performed pulse shaping, without incurring any loss of link performance. In accordance with embodiments described herein a shortened precoded EGPRS burst is provided. In accordance with one embodiment the burst shortening is performed while preserving the spectral characteristics of the signal.

In accordance with one embodiment a method of transmitting a burst of signals in a cellular radio system supporting data transmission using EGPRS/EGPRS2 is provided. The method comprises providing additional symbols in the EGPRS/EGPRS2 burst thereby forming a long burst, and pulse shaping the long burst to forming a long baseband signal whose duration exceeds the duration of one EGPRS/EGPRS2 time slot. The long baseband signal is then shortened to a shortened burst having the duration of an EGPRS/EGPRS2 time slot wherein the shortened burst fulfills the same spectrum mask requirement as the EGPRS/EGPRS2 burst, and which can be transmitted as a conventional EGPRS/EGPRS2 burst.

In accordance with one embodiment the burst length of the long burst is set to 144 symbols.

In accordance with one embodiment the transmitted symbols are precoded.

In accordance with one embodiment the additional symbols are payload and/or training symbols.

In accordance with one embodiment the shortened burst is generated by truncation of said long baseband signal followed by multiplication by a window function.

Thus, a long burst containing more payload or training symbols than an EGPRS/EGPRS2 burst is shortened to the same length as an EGPRS/EGPRS2 burst and fulfill the same spectrum mask requirements. The additional symbols can be used to increase throughput (more data symbols), improve link performance (more training symbols or lower code rates), or for other purposes such as Peak to Average Power Ratio (PAPR) reduction.

Moreover, longer bursts can be set to a highly composite sizes for the IFFT/FFT if precoding is used, which has benefits in terms of processing power and power consumption. For example the burst length can be set to 144 symbols.

In summary, burst shortening alleviates the problems with precoded EGPRS/EGPRS2 presented above while preserving backward compatibility with EGPRS/EGPRS2, and without any losses in link performance.

In accordance with one embodiment of transmitting signals in a GSM system with precoded EGPRS signals bursts, the precoded EGPRS signal bursts are shortened.

Embodiments herein also extend to a device adapted to transmit signals in accordance with the above. The device can typically be implemented in a module comprising a micro controller or a micro processor operating on a set of computer program instructions stored in a memory, which instructions when executed by the module causes the module to perform power control in accordance with the method as described above. In particular the module can comprise controller circuitry for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawings, in which.

DETAILED DESCRIPTION

For simplicity, the below examples consider burst formats of the form (4) without tail symbols. However, the invention is not limited to such an embodiment but is equally applicable to other formats.

Figure 2:
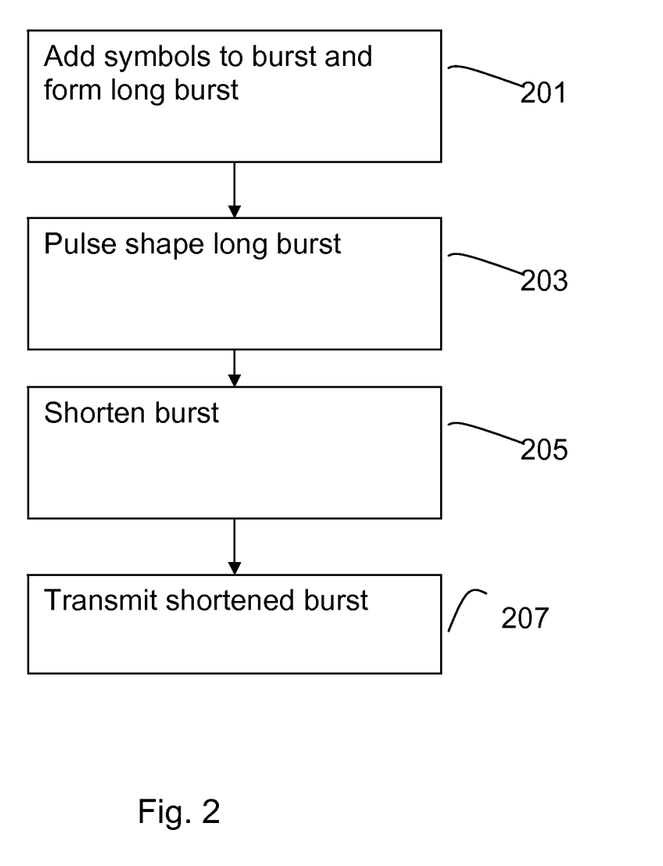
FIG. 2 is a flow chart illustrating some steps performed when transmitting a burst of EGPRS/EGPRS2 symbols.

FIG. 2 is a flow chart illustrating some steps performed when transmitting a burst of EGPRS/EGPRS2 symbols. In accordance with FIG. 2 first, in a step 201 additional symbols are added to a (conventional) EGPRS/EGPRS2 burst thereby forming a long burst. Next, in a step 203 the long burst is pulse shaped thereby forming a long baseband signal whose duration exceeds the duration of one EGPRS/EGPRS2 time slot. Next, in a step 205, the long baseband signal is shortened to a shortened burst having the duration of an EGPRS/EGPRS2 time slot wherein the shortened burst fulfills the same spectrum mask requirement as the EGPRS/EGPRS2 burst, The shortened burst is then transmitted in a step 207.

Figure 3:
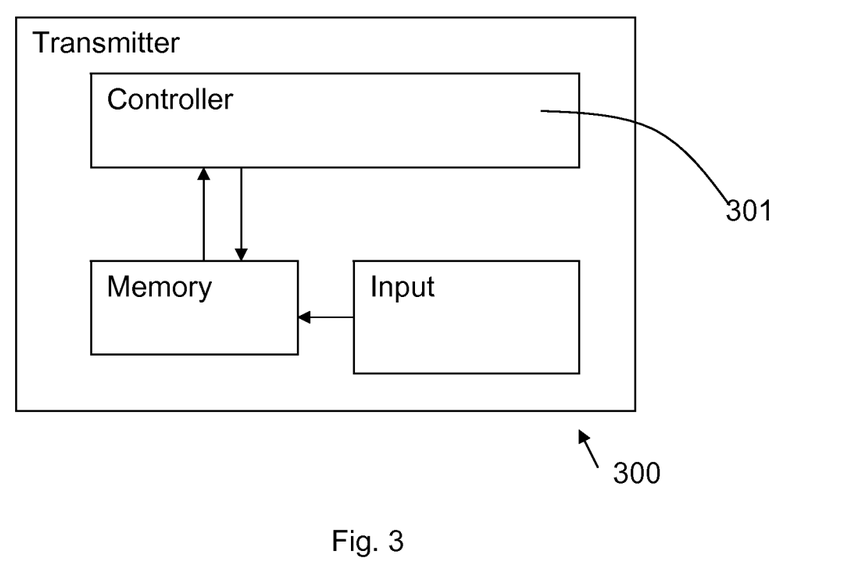
FIG. 3 is a view of a transmitter.

In FIG. 3 a transmitter 300 that can be used for transmitting bursts of data in accordance with the methods described herein is depicted. The transmitter 300 comprises controller circuitry 301 for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

Figure 4:
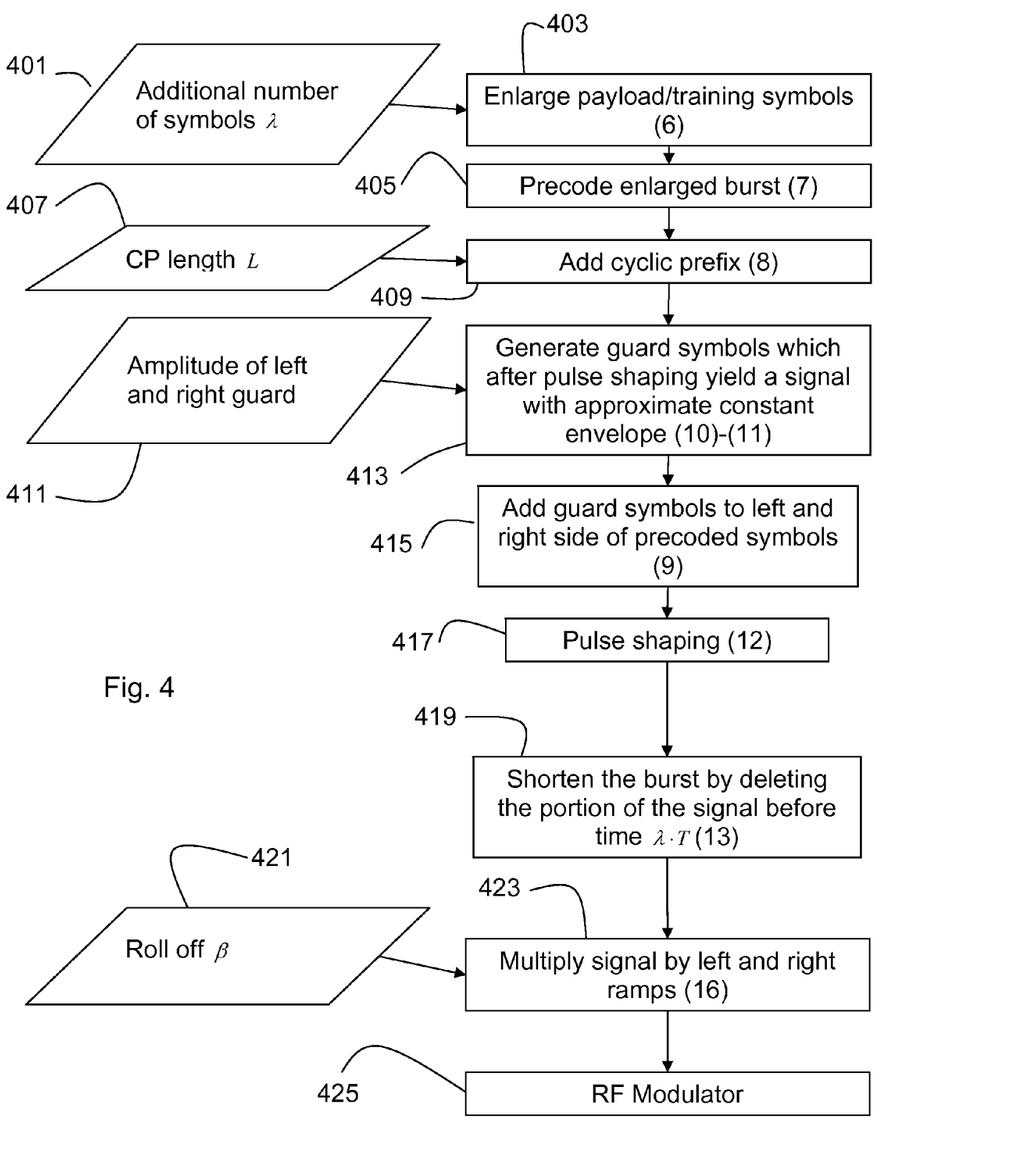
FIG. 4 is a flow chart illustrating some steps performed when transmitting a burst of EGPRS/EGPRS2 symbols.

A detailed implementation example will now be given, which is illustrated in FIG. 4. To begin, choose a positive integer $\lambda \leq L$ and enlarge the burst by $\lambda$ symbols, step 401. These symbols can be either payload, pilots or have some other use such as PAPR reduction. Specifically, the vector of payload plus data is enlarged, step 403.

$$\vec{z} = [z_1, \ldots, z_{N+\lambda}]^T \qquad (6)$$

The new symbols need not be added at the end, they can be placed anywhere in the burst. Next, the vector $\vec{z}$ is precoded, step 405.

$$\vec{Z} = {}^{(N+\lambda)}W^H \cdot \vec{z} \qquad (7)$$

Note that the new size of the Fourier transform is $N+\lambda$. After precoding, a cyclic prefix of length L is added, step 407 and step 409.

$$[Z_1^P, \ldots, Z_{N+L+\lambda}^P] \stackrel{def}{=} \qquad (8)$$
$$[Z_{N-L+\lambda}, Z_{N-L+\lambda+1}, \ldots, Z_{N+\lambda}, Z_1, Z_2, \ldots, Z_{N+\lambda}].$$

Guard symbols are added to the left and right of (7), step 415.

$$[d_1, d_2, \ldots, d_{K+\lambda}] \stackrel{def}{=} \left[ \underbrace{g_1, \ldots, g_{\xi}}_{guard}, \underbrace{Z_1^P, Z_2^P, \ldots, Z_{N+L+\lambda}^P}_{CP+payload+pilots}, \underbrace{g_{\xi+1}, \ldots, g_{\eta}}_{guard} \right]. \qquad (9)$$

A good choice for the guard symbols can be made by picking them so that the signal generated after pulse shaping has approximately constant amplitude over the guard. For example, if the pulse shaping filter is the linearized Gaussian Minimum Shift Keying (GMSK) filter, then the guard symbols may be defined by, step 413.

$$g_m = A_l e^{j\frac{\pi}{2}m}, 1 \leq m \leq \xi, \qquad (10)$$

$$g_m = A_r e^{j\frac{\pi}{2}(m-\xi)}, \xi+1 \leq m \leq \eta. \qquad (11)$$

The positive real numbers $A_l$, $A_r$ are the amplitudes of the left and right guard symbols step 411. These amplitudes can be adjusted to control the power of the signal during ramp up or ramp down.

The signal (9) is pulse shaped, step 417 using the filter $p$.

$$y(t) = \sum_n d_n \cdot p(t - nT + \varphi), 0 \leq t \leq \tau + \lambda T. \qquad (12)$$

Note that the signal (12) is $\lambda T$ seconds longer than the signal (5).

Below a description, step 419, is given how to shorten (12) so that

1. It has the same length $\tau$ as (5),
2. It fulfils the same spectrum constraints as (5), and
3. The link performance is not degraded.

Firstly, the constant $\lambda$ is chosen in such a way that the time dispersion induced by the multipath propagation radio channel (i.e. from transmit antenna to receive antenna) plus the time dispersion caused by the receive chain is less than $(L-\lambda+1) \cdot T$ seconds.

Secondly, the first $\lambda T$ seconds of (12) are erased.

$$y_\lambda(t) = y(t+\lambda T), 0 \leq t \leq \tau \qquad (13)$$

Thirdly, two raised cosine ramp functions are defined, step 421.

$$r_\beta^l(t) = \begin{cases} \frac{1}{2}\left(1 + \cos\left(\pi \frac{(\beta T - t)}{\beta T}\right)\right), & \text{if } 0 \leq t \leq \beta T \\ 1, & \text{if } t \geq \beta T. \end{cases} \qquad (14)$$

The parameter $\beta$ determines the duration of the ramping period.

$$r_\beta^r(t) = \begin{cases} \frac{1}{2}\left(1 + \cos\left(\pi \frac{(t - \tau + \beta T)}{\beta T}\right)\right), & \text{if } \tau - \beta T \leq t \leq \tau \\ 1, & \text{if } t \leq \tau - \beta T. \end{cases} \qquad (15)$$

Finally, a new shortened baseband signal is generated by the multiplication of (13), (14) and (15), step 423 and 425.

$$s(t) = y_\lambda(t) \cdot r_\beta^l(t) \cdot r_\beta^r(t), 0 \leq t \leq \tau \qquad (16)$$

Note that a portion of the signal S defined by (16) corresponding to $\lambda T$ seconds of the filtered cyclic prefix, is affected by the left ramp (14). This does not have any effect upon link performance since by design S is subject to a time dispersion of less than $\lambda T$ seconds of Hence, the received signal can still be accurately represented as a cyclic convolution of the sent symbols with a channel filter. This is a property that allows easy demodulation by means of the DFT, and it explains why the shortened signal (16) does not suffer from degraded performance. Moreover, the spectrum of the product of the ramps (14) and (15) is easily obtained from the usual raised cosine spectrum and its impulse response, see Digital Communications, J. Proakis, Mc Graw Hill 4$^{th}$ Ed. (2000), but interchanging the time and frequency domains. Indeed, the product $r_\beta^l(t) \cdot r_\beta^r(t)$ defines a raised cosine window in the time domain, while the usual definition gives the raised cosine window in the frequency domain, see Digital Communications, J. Proakis, Mc Graw Hill 4$^{th}$ Ed. (2000). Thus, the spectrum of $r_\beta^l(t) \cdot r_\beta^r(t)$ is a modified sinc function, see Digital Communications, J. Proakis, Mc Graw Hill 4$^{th}$ Ed. (2000) and the magnitude of its side lobes is controlled by the roll off $\beta$. Since the spectrum of s is given by the circular convolution of the frequency response of the 3 terms $$y_\lambda(t), r_\beta^l(t) \text{ and } r_\beta^r(t) \qquad (17)$$

will satisfy the same spectral mask requirements as (5) provided $\beta$ is large enough. Observe that since the ramps have the value 0 for t<0 or t>$\tau+\lambda T$, the signal (12) can be extended to t<0 or t>$\tau+\lambda T$ without affecting the burst shortening method. This can be useful in order to ensure that the spectrum of (12) is as narrow as possible and that the high frequency components decay as fast as possible. It is also clear from the description above that the raised cosine ramps (14)

and (15) can be replaced by other ramping functions provided the spectrum of the shortened signal (16) satisfies the same spectrum mask requirements as (5).

An exemplary burst shortening method is depicted in FIG. 4, which illustrates some procedural steps in accordance with the method described above Table 1 gives an example of typical parameter values that can be used in an embodiment of the invention which is backwards compatible with EGPRS/EGPRS2 at the normal symbol rate.

TABLE 1

Parameter Values

| Parameter | Value |
|---|---|
| $\lambda$ | 2 |
| $\eta$ | 8 |
| $\xi$ | 4 |
| $\beta$ | 4 |
| T | 48/13 µs (Normal Symbol Rate) |
| N | 142 (=26 training + 116 payload) |
| $\tau$ | 577 µs |
| L | 6 |
| $A_l$ | 1 |
| $A_r$ | 0.5 |

The size of the Fourier transform is $N+\lambda=144=2^4 \times 3^2$, which is a highly composite number. An IFFT of size $144=2^4 \times 3^2$ is typically 3 to 10 times faster than an IFFT of N=142, depending on hardware capabilities and implementation details.

Figure 5:
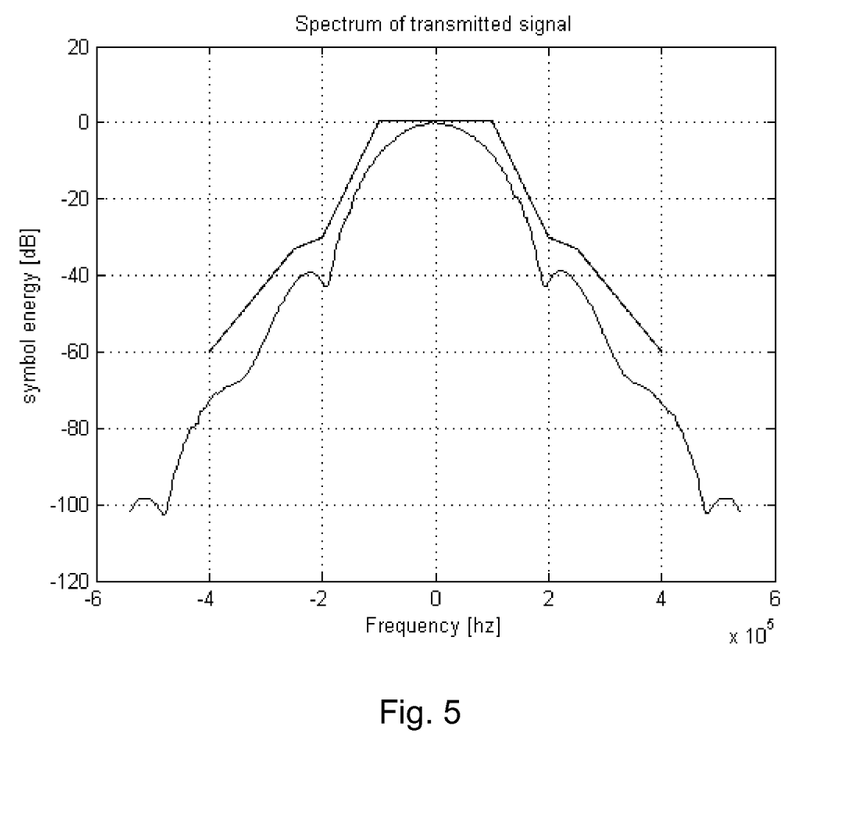
FIG. 5 depicts a spectrum mask.

The amount of time dispersion due to multipath radio propagation and receive filtering that can be effectively compensated is 5T=18.5 µs. With these values of the parameters the spectrum mask requirement for normal symbol rate, see 3GPP TS 45.005 Radio Transmission and Reception is fulfilled. This is depicted in FIG. 5, which shows the spectrum of a shortened, IDFT precoded burst and a spectrum mask requirement in accordance with 3GPP TS 45.005 Radio Transmission and Reception.

Figure 6:
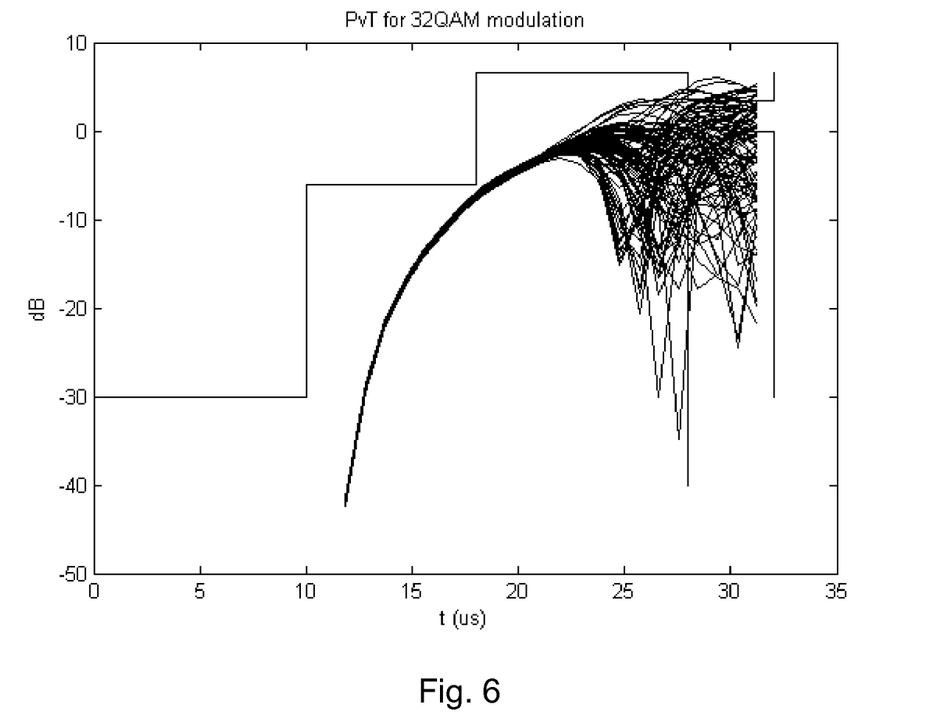
FIGS. 6 and 7 depict left and right portions of the power vs. time mask.
Figure 7:
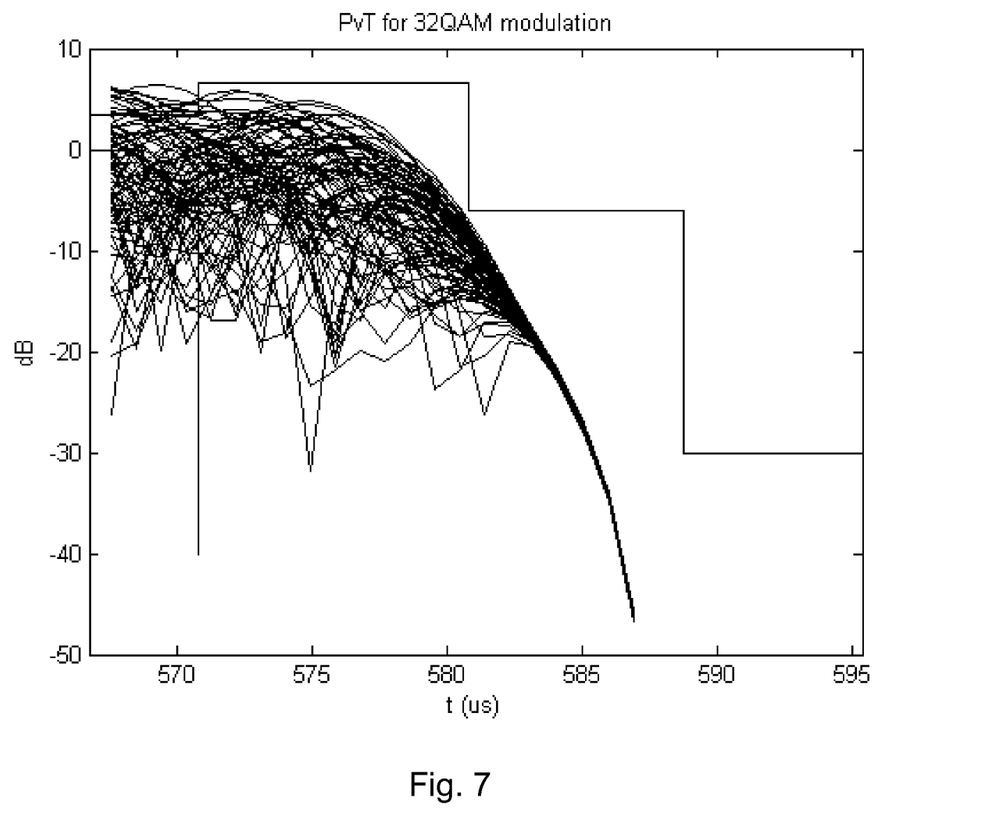

The left and right portions of the power vs. time mask, see 3GPP TS 45.005 Radio Transmission and Reception, together with simulated shortened bursts, are shown in FIGS. 6 and 7, respectively.

Thus, FIG. 6 shows burst power vs. time for shortened, IDFT precoded bursts. Also shown is the left part of power vs. time mask in accordance with 3GPP TS 45.005 Radio Transmission and Reception.

Further FIG. 7 illustrates power vs. time for shortened, IDFT precoded bursts. Also shown is the right part of power vs. time mask in accordance with 3GPP TS 45.005 Radio Transmission and Reception This shows that the output power does not exceed the maximum allowed power during ramping up or ramping down according to the power vs. time mask as set out in 3GPP TS 45.005 Radio Transmission and Reception.

By using the methods and devices as described herein for shortening the burst applied to EGPRS/EGPRS2, in particular a precoded EGPRS/EGPRS2 burst a number of advantages compared to conventional transmission is achieved. Thus, either the payload or the training sequence (or both) can be increased, resulting in improved link performance, increased throughput or both. In addition it can be used to increase the length of the IDFT. This is beneficial because the prime factor decomposition of the length of the IDFT determines the computational efficiency of the IFFT. For example, an IFFT of length $142=2\times71$ is typically 3 to 10 times more complex than an IFFT of length $144=2^4 \times 3^2$. Thus, a tool for simplifying the computational burden on the precoder is provided. This is essential for backward compatibility with legacy base stations. Moreover a more effective FFT also saves battery and processing time in the mobile station. In addition it is possible to preserve the spectrum mask of EGPRS/EGPRS2.

The invention claimed is:

1. A method of transmitting a burst of signals in a cellular radio system supporting data transmission using Enhanced Data rates for GSM Evolution (EGPRS)/EGPRS phase 2 (EGPRS2), the method comprising:
   providing additional symbols in an EGPRS/EGPRS2 burst to thereby form a long burst,
   pulse shaping said long burst to form a long baseband signal having a duration that exceeds the duration of one EGPRS/EGPRS2 time slot,
   shortening said long baseband signal to form a shortened burst that has the duration of an EGPRS/EGPRS2 time slot and that fulfills the same spectrum mask requirement as said EGPRS/EGPRS2 burst, and
   transmitting the shortened burst.

2. The method of claim 1, wherein the burst length of the long burst is set to 144 symbols.

3. The method according to claim 1, wherein the transmitted symbols are precoded.

4. The method according to claim 1, wherein the additional symbols are at least one of payload and training symbols.

5. The method according to claim 1, wherein said shortening comprises truncating said long baseband signal and then multiplying the truncated signal by a window function to form the shortened burst.

6. A transmitter for transmitting a burst of signals in a cellular radio system supporting data transmission using Enhanced Data rates for GSM Evolution (EGPRS)/EGPRS phase 2 (EGPRS2), the transmitter comprising controller circuitry configured to:
   provide additional symbols in an EGPRS/EGPRS2 burst to thereby form a long burst,
   pulse shape said long burst to form a long baseband signal having a duration that exceeds the duration of one EGPRS/EGPRS2 time slot,
   shorten said long baseband signal to form a shortened burst that has the duration of an EGPRS/EGPRS2 time slot and that fulfills the same spectrum mask requirement as said EGPRS/EGPRS2 burst, and
   transmit the shortened burst.

7. The transmitter according to claim 6, wherein the burst length of the long burst is 144 symbols.

8. The transmitter according to claim 6, wherein the controller circuitry is further configured to precode the symbols of the shortened burst.

9. The transmitter according to claim 6, wherein the additional symbols are at least one of payload and training symbols.

10. The transmitter according to claim 6, wherein the controller circuitry is configured to shorten the long burst by truncating the long baseband signal and then multiplying the trunscated signal by a window function to form the shortened burst.

* * * * *

UNITED STATES PATENT AND TRADEMARK OFFICE
CERTIFICATE OF CORRECTION

PATENT NO. : 8,565,340 B2
APPLICATION NO. : 13/039377
DATED : October 22, 2013
INVENTOR(S) : Miguel M. Lopez et al.

It is certified that error appears in the above-identified patent and that said Letters Patent is hereby corrected as shown below:

In the Specification

In Column 5, Line 19, in Equation (6), delete " $\vec{z} = [z_1, \ldots, z_{N+\lambda}]^T$ " and insert -- $\vec{z} = [z_1, \cdots, z_{N+\lambda}]^T$ --, therefor.

In Column 5, Line 25, in Equation (7), delete " $\vec{Z} = (^{N+\lambda}W)^H \cdot \vec{z}$ " and insert -- $\vec{Z} = (^{N+\lambda}W)^H \cdot \vec{z}$ --, therefor.

In Column 6, line 12, in Equation (13), delete " $y_\lambda(t) = y(t+\lambda T), 0 \le t \le \tau$ " and insert -- $y_\lambda(t) = y(t+\lambda T), \; 0 \le t \le \tau$ --, therefor.

In Column 6, line 34, Equation (16), delete " $s(t) = y_\lambda(t) \cdot r_\beta^l(t) \cdot r_\beta^r(t), 0 \le t \le \tau$ " and insert -- $s(t) = y_\lambda(t) \cdot r_\beta^l(t) \cdot r_\beta^r(t), \; 0 \le t \le \tau$ --, therefor.

In Column 6, line 35, delete "signal S" and insert -- signal s --, therefor.

In Column 6, line 38, delete "S is" and insert -- s is --, therefor.

Signed and Sealed this
Seventh Day of October, 2014

Michelle K. Lee
*Deputy Director of the United States Patent and Trademark Office*

CERTIFICATE OF CORRECTION (continued)
U.S. Pat. No. 8,565,340 B2

In Column 6, line 39, delete "λT seconds of" and insert -- (L − λ + 1)·T seconds. --, therefor.

In Column 6, line 59, Equation (17), delete "$y_\lambda(t), r_\beta^l(t)$ and $r_\beta^r(t)$" and insert -- $y_\lambda(t), r_\beta^l(t)$ and $r_\beta^r(t)$ --, therefor.

In the Claims

In Column 8, line 61, in Claim 10, delete "trunscated" and insert -- truncated --, therefor.